(12) United States Patent
Campbell et al.

(10) Patent No.: US 10,850,848 B2
(45) Date of Patent: *Dec. 1, 2020

(54) CURVED SEATING LAYOUT

(71) Applicant: The Boeing Company, Chicago, IL (US)

(72) Inventors: Lowell Bruce Campbell, Mukilteo, WA (US); Gregory J. Oakes, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 389 days.

This patent is subject to a terminal disclaimer.

(21) Appl. No.: 15/858,593

(22) Filed: Dec. 29, 2017

(65) Prior Publication Data

US 2018/0141664 A1 May 24, 2018

Related U.S. Application Data

(63) Continuation of application No. 13/664,361, filed on Oct. 30, 2012, now Pat. No. 9,889,936.

(51) Int. Cl.
*B64D 11/06* (2006.01)

(52) U.S. Cl.
CPC .......... *B64D 11/06* (2013.01); *B64D 11/0601* (2014.12)

(58) Field of Classification Search
CPC ............ B64D 11/0601; B64D 11/0648; B64D 11/0698
See application file for complete search history.

(56) References Cited

U.S. PATENT DOCUMENTS

| | | |
|---|---|---|
| 2,046,859 A | 7/1936 | Weiss et al. |
| 2,106,066 A | 1/1938 | Sadgrove |
| 2,116,366 A | 5/1938 | Scott |
| 2,332,841 A | 10/1943 | Burton et al. |
| 2,414,730 A | 1/1947 | Flogaus |
| 2,523,960 A | 9/1950 | Liljengren et al. |
| 2,557,885 A | 6/1951 | Murphy et al. |
| 2,947,349 A | 8/1960 | Kryter |

(Continued)

FOREIGN PATENT DOCUMENTS

| | | |
|---|---|---|
| DE | 195 26 840 | 1/1997 |
| DE | 102008044712 A1 | 3/2010 |
| EP | 2272711 A1 | 1/2011 |

OTHER PUBLICATIONS

English Translation of Abstract of German Patent Application No. DE102008044712.

(Continued)

*Primary Examiner* — Richard R. Green
(74) *Attorney, Agent, or Firm* — McDonnell Boehnen Hulbert & Berghoff LLP

(57) ABSTRACT

A forward concave trapezoidal seating system and methods are presented. Trapezoidal seats comprise a front side smaller than a rear side. The trapezoidal seats are aligned in a forward arc from a straight seat to a most-angled seat. A straight side of the straight seat is configured to substantially align with a center line of an aircraft fuselage. A most-angled side of the most-angled seat is angled inboard relative to the straight side, and the most-angled seat is outboard of the straight seat. A side unit is coupled to the most-angled side and supports the trapezoidal seats.

20 Claims, 18 Drawing Sheets

(56) References Cited

U.S. PATENT DOCUMENTS

| | | |
|---|---|---|
| 3,020,087 A | 2/1962 | Macklin |
| 3,142,514 A | 7/1964 | Ginat |
| 3,185,305 A | 5/1965 | Silverman |
| 3,480,240 A | 11/1969 | Del Giudice |
| 3,482,875 A | 12/1969 | Barecki et al. |
| 3,619,004 A | 11/1971 | McKeman et al. |
| 3,619,006 A | 11/1971 | Berecki |
| 3,632,159 A | 1/1972 | Barecki |
| 3,893,729 A | 7/1975 | Sherman et al. |
| 3,951,454 A | 4/1976 | Tantlinger |
| 4,066,227 A | 1/1978 | Buchsel |
| 4,489,978 A | 12/1984 | Brennan |
| 4,526,421 A | 7/1985 | Brennan et al. |
| 4,890,884 A | 1/1990 | Olson |
| 4,936,620 A | 6/1990 | Francois et al. |
| 5,104,065 A | 4/1992 | Daharsh et al. |
| 5,131,607 A | 7/1992 | Arnold et al. |
| 5,178,345 A | 1/1993 | Peltola et al. |
| 5,716,026 A | 2/1998 | Pascasio et al. |
| 6,012,679 A | 1/2000 | Auestad |
| 6,059,364 A | 5/2000 | Dryburgh et al. |
| 6,106,066 A | 8/2000 | Moffa et al. |
| 6,273,365 B1 | 8/2001 | Hiesener et al. |
| 6,394,525 B1 | 5/2002 | Seibold |
| 6,616,099 B2 | 9/2003 | Sankrithi |
| 6,739,552 B2 | 5/2004 | Sankrithi et al. |
| 7,252,268 B2 | 8/2007 | Saint-Jalmes |
| 7,320,446 B2 | 1/2008 | Saint-Jalmes et al. |
| D583,579 S | 12/2008 | Pearson et al. |
| 7,469,861 B2 | 12/2008 | Ferry et al. |
| 7,578,470 B2 | 8/2009 | Plant |
| 7,717,510 B2 | 5/2010 | Herold, III et al. |
| 7,780,115 B2 | 8/2010 | Watanabe |
| 7,918,504 B2 * | 4/2011 | Thompson ......... B64D 11/0601 297/248 |
| 8,196,864 B2 | 6/2012 | Ruiter et al. |
| 8,944,505 B2 | 2/2015 | Khalil et al. |
| 10,287,018 B2 * | 5/2019 | Weifenbach ....... B64D 11/0601 |
| 2001/0003962 A1 | 6/2001 | Park et al. |
| 2005/0046220 A1 | 3/2005 | Hernandez et al. |
| 2007/0170310 A1 | 7/2007 | Bock et al. |
| 2007/0267543 A1 | 11/2007 | Boren et al. |
| 2009/0146004 A1 | 6/2009 | Plant |
| 2009/0146006 A1 | 6/2009 | Bettell |
| 2009/0243352 A1 | 10/2009 | Cailleteau |
| 2009/0283636 A1 | 11/2009 | Saint-Jalmes et al. |
| 2009/0302158 A1 | 12/2009 | Darbyshire et al. |
| 2010/0193634 A1 | 8/2010 | Hankinson et al. |
| 2011/0101161 A1 | 5/2011 | Saint-Jalmes et al. |
| 2011/0226900 A1 | 9/2011 | Bamford et al. |
| 2011/0260003 A1 | 10/2011 | Guering et al. |
| 2014/0210235 A1 | 7/2014 | Ferry et al. |
| 2015/0175266 A1 | 6/2015 | Ferry et al. |

OTHER PUBLICATIONS

Extended European Search Report Issued in European Patent Application No. 13184375.7 dated May 20, 2015.
Extended European Search Report prepared by the European Patent Office in application No. EP 19 16 8493.5 dated Jul. 3, 2019.

* cited by examiner

FIG. 4B

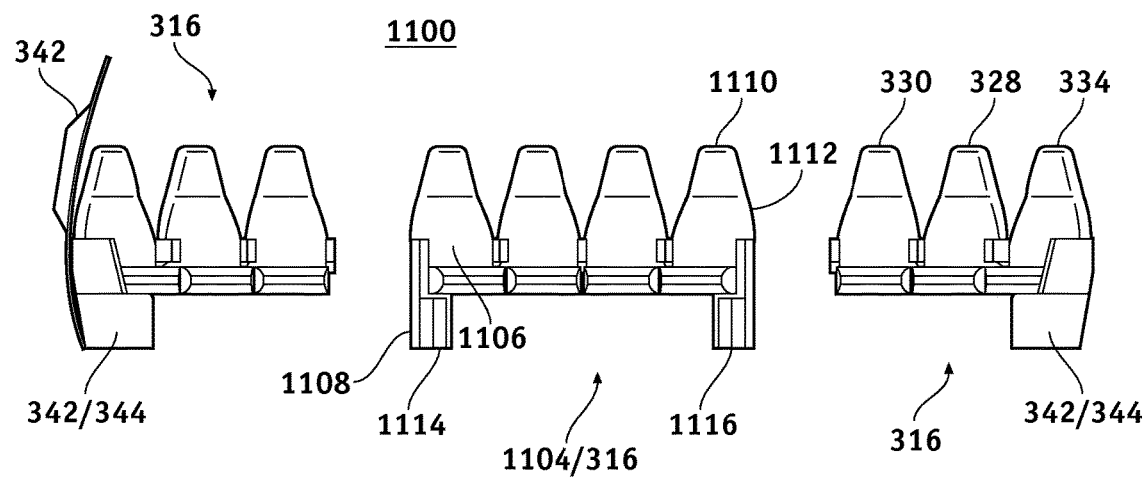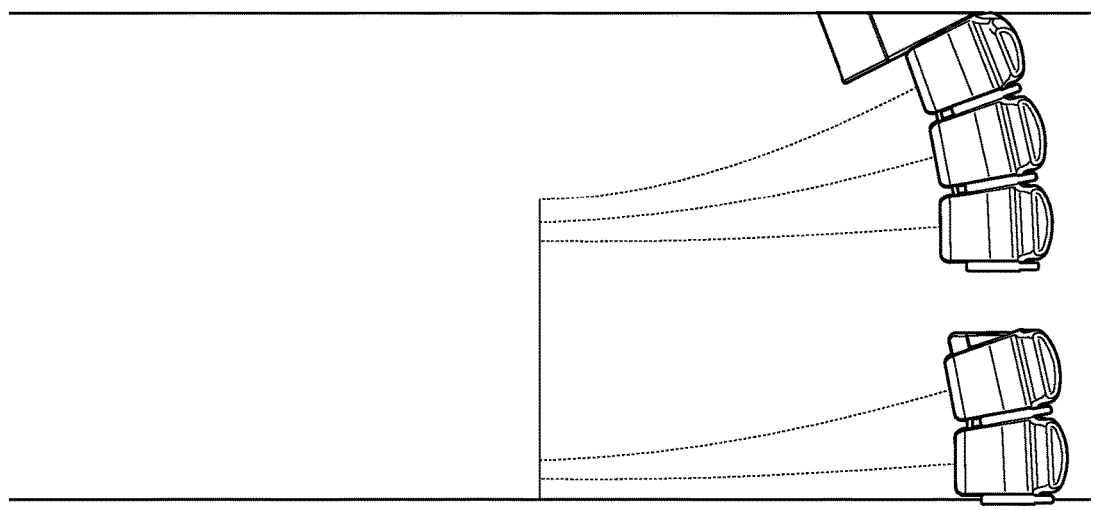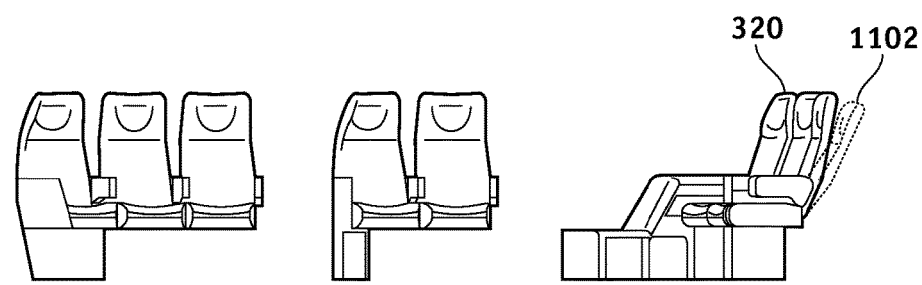
FIG. 11

US 10,850,848 B2

CURVED SEATING LAYOUT

CROSS-REFERENCE TO RELATED APPLICATIONS

This application is a continuation of U.S. application Ser. No. 13/664,361, filed Oct. 30, 2012, which is incorporated by reference herein in its entirety.

FIELD

Embodiments of the present disclosure relate generally to seating design. More particularly, embodiments of the present disclosure relate to aircraft seating design.

BACKGROUND

Due to aerodynamic and weight limits, commercial aircraft generally have a limited interior volume. The limited interior volume generally further limits an available floor space and space for seating. Commercial aircraft are generally configured in a linear configuration of rows and columns of seats.

SUMMARY

A forward concave trapezoidal seating system and methods are presented. Trapezoidal seats comprise a front side smaller than a rear side. The trapezoidal seats are aligned in a forward arc from a straight seat to a most-angled seat from among the trapezoidal seats. A straight side of the straight seat is configured to substantially align with a center line of an aircraft fuselage. A most-angled side of the most-angled seat is angled inboard relative to the straight side, and the most-angled seat is outboard of the straight seat. A side unit is coupled to the most-angled side and supports the trapezoidal seats.

Current seating generally assumes a floor area taken by a passenger is a rectangle. Embodiments of the disclosure provide a curved seating arrangement using trapezoidal wedges allowing greater seat width without decreasing a quantity of seats which can be fit into an airplane cabin zone. Embodiments of the disclosure also provide triangular side stowage units without decreasing seat width. Furthermore, embodiments of the disclosure increase a number of seats that may be fit in a seating area. A triangular shaped passenger sidewall floor storage bin is enabled via using trapezoid shaped seat cushions on passenger seats placed in a curved seating row.

In an embodiment, a forward concave trapezoidal seating system comprises trapezoidal seats. The trapezoidal seats comprise a front side smaller than a rear side, and the trapezoidal seats are aligned in a forward arc from a straight seat to a most-angled seat. The straight side of the straight seat is configured to substantially align with a center line of an aircraft fuselage. The most-angled side of the most-angled seat angled inboard relative to the straight side, and the most-angled seat outboard of the straight seat. A side unit is coupled to the most-angled side and supports the trapezoidal seats.

In another embodiment, a method for configuring a curved seating arrangement in an aircraft aligns a plurality of trapezoidal seats comprising a front side smaller than a rear side in a forward arc from a straight seat from among the trapezoidal seats to a most-angled seat from among the trapezoidal seats. The method further configures a straight side of the straight seat to substantially align with a center line of an aircraft fuselage, and configures the most-angled seat outboard of the straight seat. The method further configures a most-angled side of the most-angled seat at an angle inboard relative to the straight side, and couples a side unit that supports the trapezoidal seats to the most-angled side.

In a further embodiment, a method for configuring aircraft passenger cabin seating configures a plurality of curved seating arcs each comprising a plurality of trapezoidal seats comprising a front side smaller than a rear side. The method further aligns each of the curved seating arcs in a forward arc from a straight seat from among the trapezoidal seats to a most-angled seat from among the trapezoidal seats. The method further positions the curved seating arcs in an aircraft cabin.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 4B is an illustration of an expanded plan view of a portion of the interior of the passenger area of the aircraft shown in FIG. 4A showing an exemplary curved seating arrangement in more detail according to an embodiment of the disclosure.

FIG. 11 is an illustration of various views of an exemplary curved seating arrangement according to an embodiment of the disclosure.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aircraft seating, aircraft seat layout, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, curved seating for an aircraft cabin. Embodiments of the disclosure, however, are not limited to such an aircraft cabin applications, and the techniques described herein may also be utilized in other applications. For example but without limitation, embodiments may be applicable to air, sea, river or land transport vehicles.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
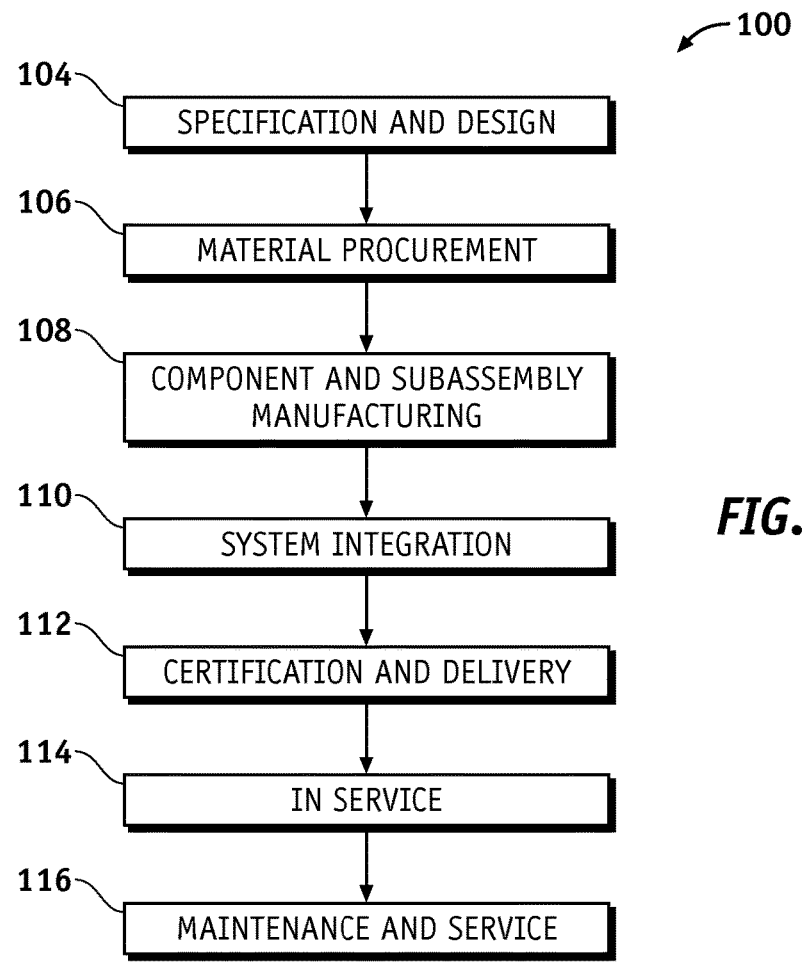
FIG. 1 is an illustration of a flow diagram of an exemplary aircraft production and service methodology.
Figure 2:
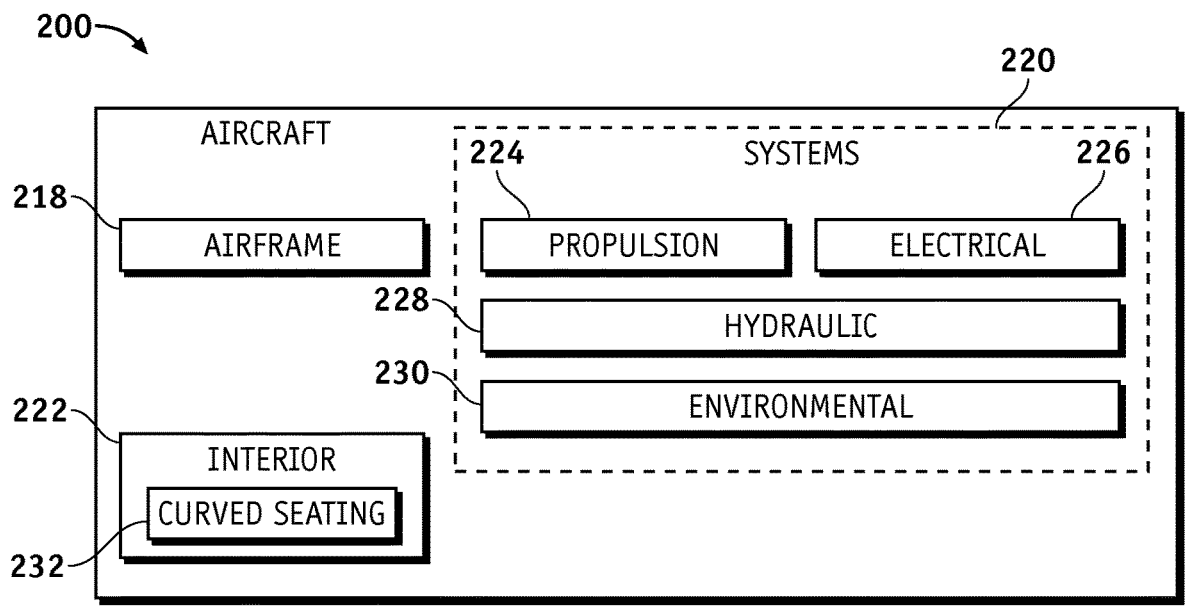
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and integration of system 110 (system integration 110) of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 2, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and curved seating 232. Any number of other systems may also be included.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
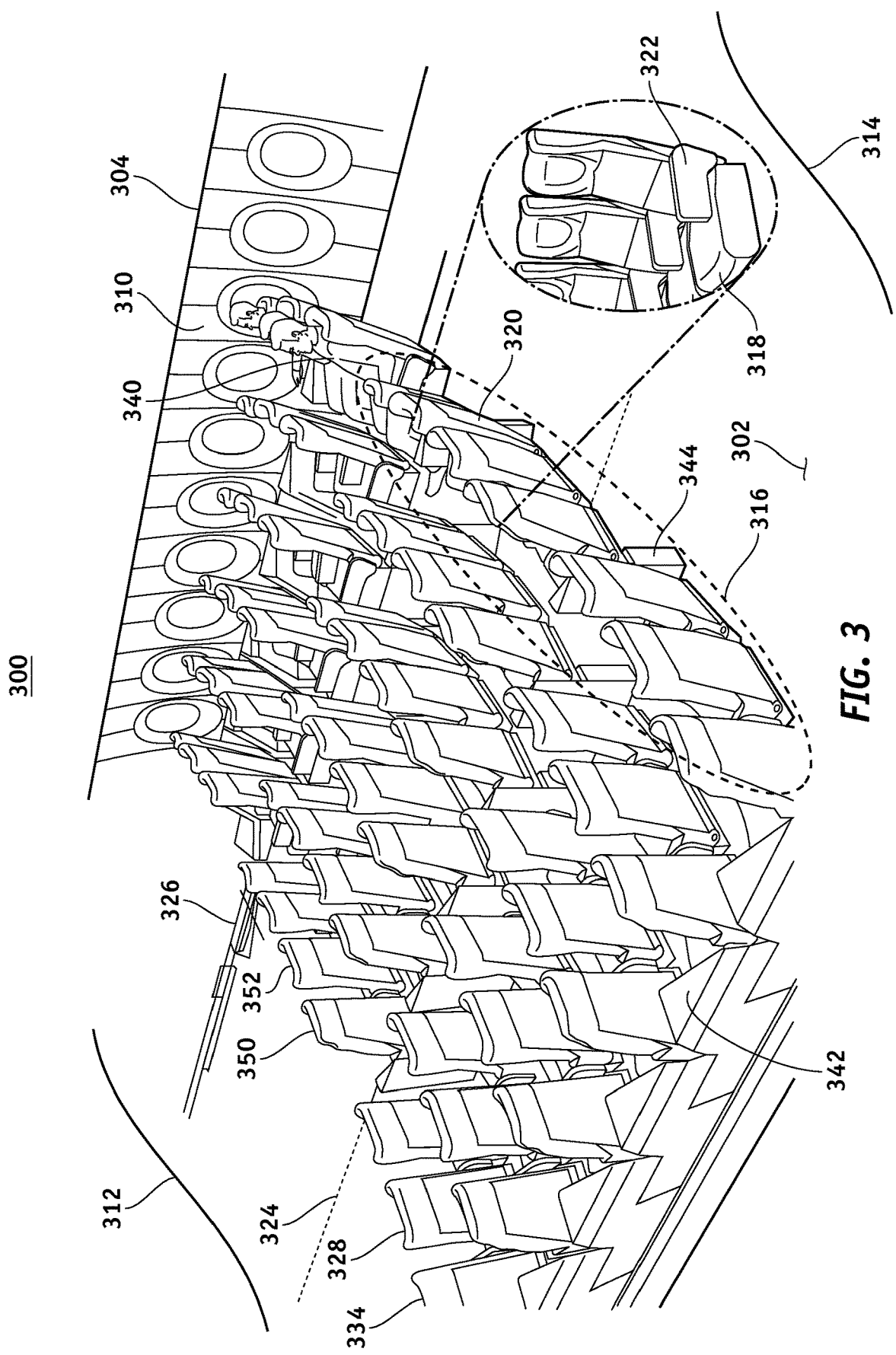
FIG. 3 is an illustration of an isometric view of an interior of a passenger area of an aircraft showing an exemplary curved seating arrangement according to an embodiment of the disclosure.
Figure 4A:
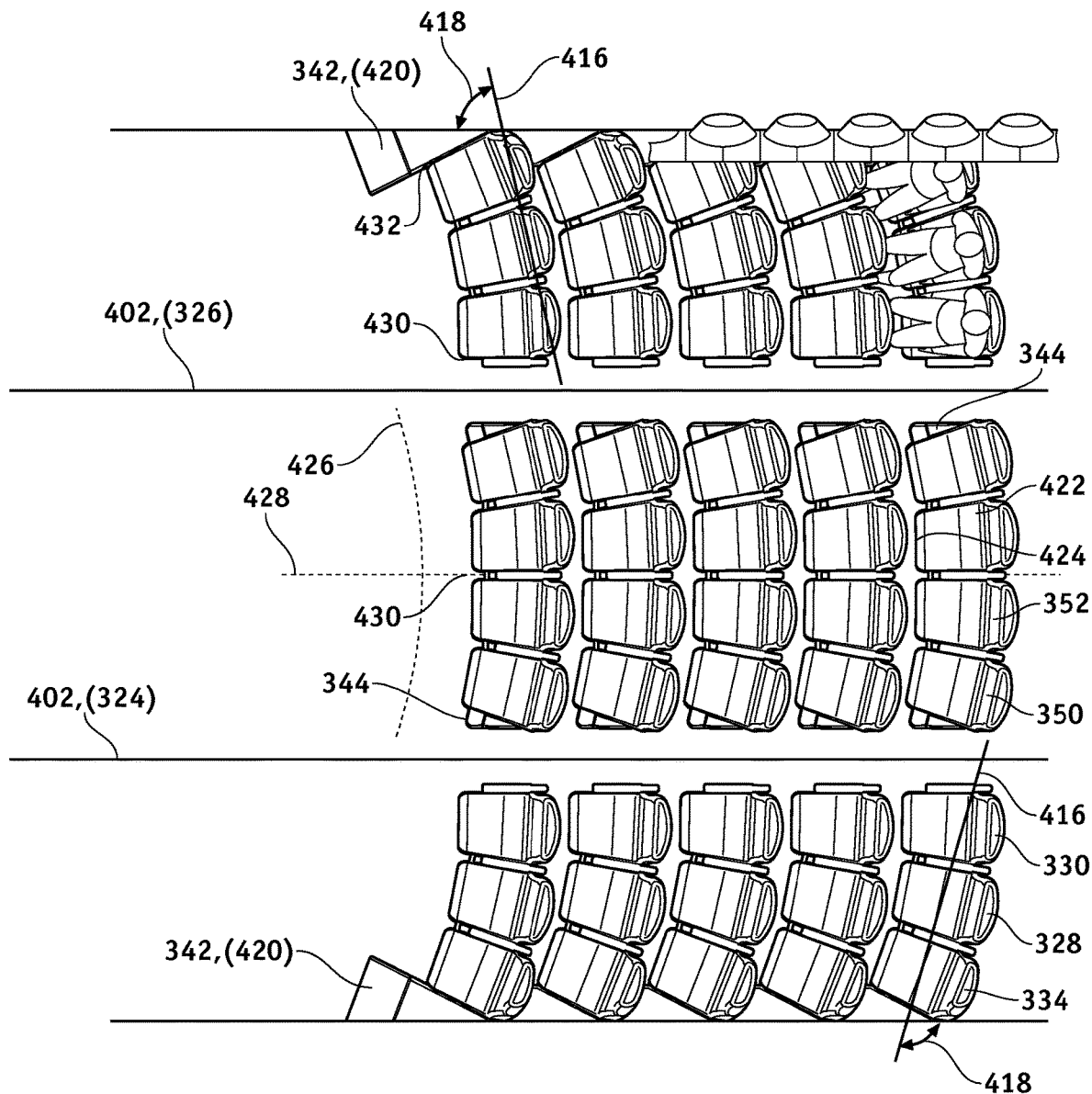
FIG. 4A is an illustration of a plan view of an interior of a passenger area of an aircraft showing an exemplary curved seating arrangement according to an embodiment of the disclosure.

FIG. 3 is an illustration of an isometric view of an interior such as the interior 222 of a passenger area 300 of an aircraft such as the aircraft 200 showing an exemplary curved seating arrangement according to an embodiment of the disclosure. FIG. 4A is an illustration of a plan view of the interior 222 of the passenger area 300 of the aircraft 200 showing an exemplary curved seating arrangement according to an embodiment of the disclosure.

The passenger area 300 comprises a floor 302, a ceiling 304 and sidewalls 310 fitted inside a fuselage between a front end 312 and a rear 314. The passenger area 300 comprises passenger chair seating such as the seats 316, each of which have a trapezoidal base 318, a back 320 and arm rests 322. The seats 316 are arranged in a row wherein the seats 316 are adjacent to each other, and which are spaced along two aisles 324/326 in a transverse direction thereto. Each of the seats 316 (trapezoidal seats 316) may be wider at a rear side 422 of each of the trapezoidal seats 316 than a front side 424 of the trapezoidal seats 316. Furthermore, the trapezoidal base 318 at the back 320 of the trapezoidal seats 316, where a passenger 340 torso rests, is wider than the front side 424 of the trapezoidal seats 316 where legs of the passenger 340 are positioned.

As used wherein, a row may comprise a group of adjacent seats that need not be in a strict straight line linear arrangement, and a row may mean a curved row. Row, curved row, seating row and curved seating row may be used interchangeably in this document.

A line 416 from the outboard aisle seat 330 to one of sidewall seats 334 is at a non-perpendicular angle 418 to the adjacent sidewall 310 and the aisle 324/326, providing an open area 420 next to the adjacent sidewall 310. The non-perpendicular angle 418 may comprise, for example but without limitation, greater than about 99 and less than about 100 degrees such as about 99.75 degrees. The open area 420 allows locating a triangular shaped passenger floor storage bin 342 (floor storage unit 342) coupled to each of the sidewalls 310. A size of the open area 420 and the floor storage unit 342 may depend on a spacing between seat rows (row pitch, see 902 in FIG. 9). For example, a front row or an exit row may have a larger row pitch and thus comprise more room for the floor storage unit 342.

In an embodiment, the trapezoidal seats 316 are aligned in a forward arc 426 from a straight seat from among the trapezoidal seats 316 to a most-angled seat from among the trapezoidal seats 316. The most-angled seat is located outboard of the straight seat. The straight seat may be the outboard aisle seat 330 and the most-angled seat may be the sidewall seat 334. Alternatively, the straight seat may comprise a row center seat 352 and the most-angled seat may be a center section aisle seat 350.

A straight side 430 of the straight seat is configured to substantially align (in parallel with) with a center line 428 of a fuselage of the aircraft 200 (FIG. 2). A most-angled side 432 of the most-angled seat is angled inboard relative to the straight side 430, where the most-angled seat is located outboard of the straight seat.

A side unit such as the triangular shaped passenger floor storage bin 342 comprising a storage space, or a side support unit 344 may be coupled to the most-angled side 432 to support the trapezoidal seats 316.

The most-angled seat is aligned at an angle that reduces an effect of a centrifugal force, a yaw force, and/or a roll force on the passenger 340. The most-angled seat may be the sidewall seat 334 and/or a center section aisle seat 350 (also shown in FIG. 4B).

Figure 4B:
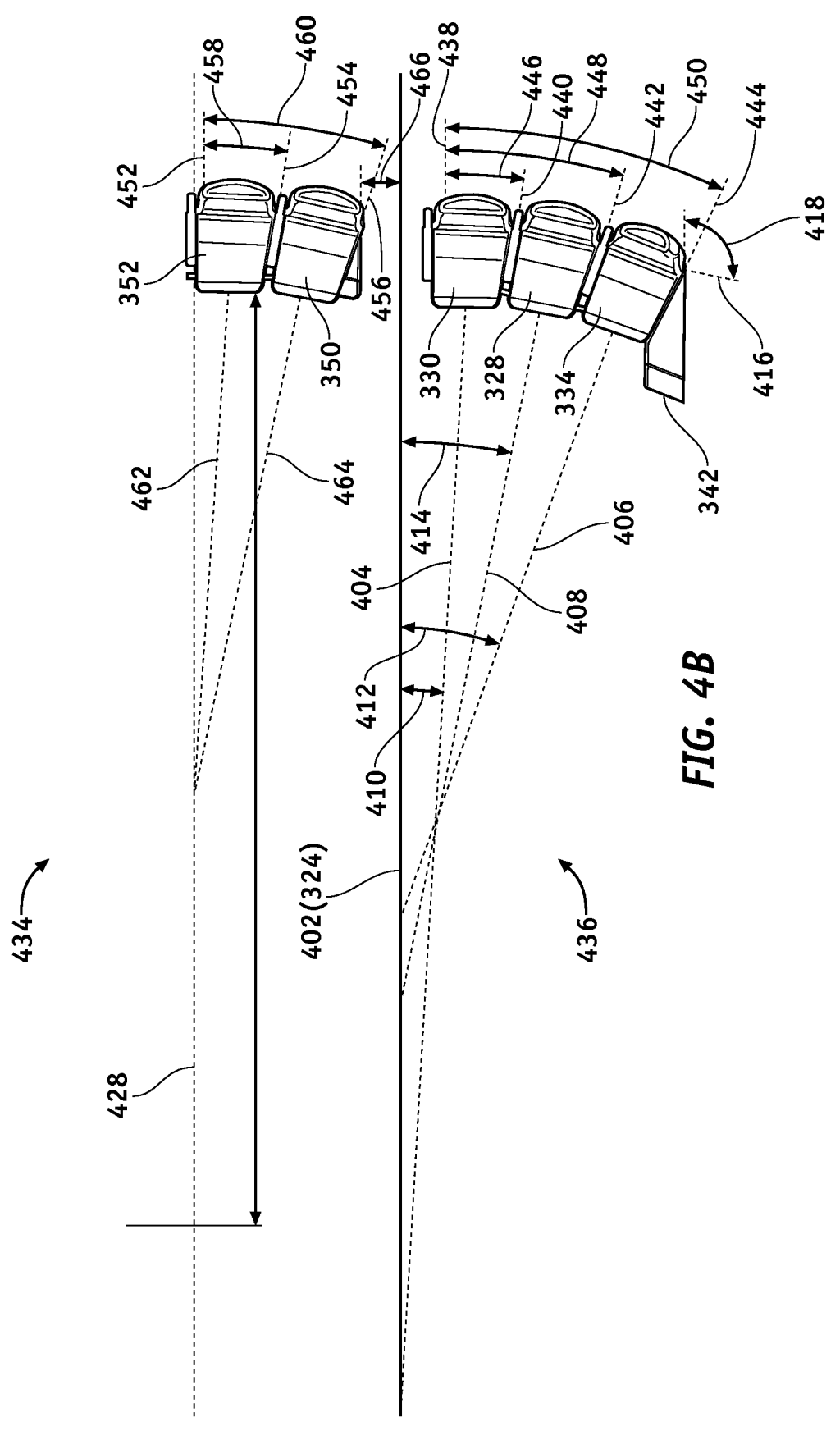

FIG. 4B is an illustration of an expanded plan view of a portion of the interior 222 (FIG. 2) of the passenger area 300 of the aircraft 200 (FIG. 2) shown in FIG. 4A showing an exemplary curved seating arrangement in more detail according to an embodiment of the disclosure. FIG. 4B is described herein in conjunction with FIG. 3.

The aisles 324/326 comprise parallel longitudinal planes of symmetry 402 parallel with the center line 428. The center section aisle seats 350 are adjacent to one of the aisles 324/326 and comprise a respective plane of reference 464 of the center section aisle seat 350. The outboard aisle seats 330 are adjacent to one of the aisles 324/326 and comprise a respective plane of reference 404 of the outboard aisle seat 330. The sidewall seats 334 are adjacent to one of the sidewalls 310 and comprise a respective plane of reference 406 of the sidewall seat 334. Row center seats 328 are not adjacent to one of the aisles 324/326 or one of the sidewalls 310 and comprise a respective plane of reference 408 thereof. Depending on a cabin configuration of the passenger area 300, various numbers of the row center seats 328 may be between the center section aisle seat 350 and the sidewall seat 334.

The plane of reference 404 of each outboard aisle seat 330 is inclined with respect to the parallel longitudinal planes of symmetry 402 of the aisles 324/326 and the center line 428. The plane of reference 404 of each outboard aisle seat 330 forms an acute angle 410 relative to the parallel longitudinal planes of symmetry 402 and the center line 428 of, for example, more than about 4 degrees and less than about 5 degrees such as about 4.5 degrees opening towards the back 320 of the trapezoidal seats 316. The sidewall seats 334 are arranged differently. When a row has three seats, as shown in FIGS. 4A and 4B, the plane of reference 406 forms an acute angle 412 with the parallel longitudinal planes of symmetry 402 and the center line 428, opening towards the back 320 of the trapezoidal seats 316.

The acute angle 412 may comprise, for example, less than about 23 degrees, more than about 22 degrees and about 22.5 degrees opening towards the back 320 of the trapezoidal seats 316. The row center seats 328 which are not adjacent to an aisle nor to one of the sidewalls 310 each have a plane of reference 408 which forms an acute angle 414 with the parallel longitudinal planes of symmetry 402 and the center line 428. The acute angle 414 may comprise, for example, less than about 14 degrees, more than about 13 degrees and about 13.5 degrees opening towards the back 320 of the trapezoidal seats 316.

Each of the outboard aisle seats 330 (e.g., for multiple rows) in the outboard section 436 forms an angle 446 between a plane of reference 438 and a plane of reference 440. The plane of reference 438 of the outboard aisle seat 330 may be substantially parallel with the parallel longitudinal planes of symmetry 402 and the center line 428. The row center seats 328 in the outboard section 436 which are not adjacent to an aisle nor to one of the sidewalls 310 each forms an angle 448 between the plane of reference 438 and a plane of reference 442. Each of the sidewall seats 334 forms an angle 450 between the plane of reference 438 and a plane of reference 444.

Each of the center section aisle seats 350 in a center section 434 forms an angle 460 between a plane of reference 452 and a plane of reference 456. The plane of reference 452 may be substantially parallel with the parallel longitudinal planes of symmetry 402 and the center line 428. Center section straight seats 352 in the center section 434 are not adjacent to an aisle 324/326 nor to one of the sidewalls 310, and each forms an angle 458 between the plane of reference 452 and plane of reference 454.

Each angle is additive, so in one embodiment for example, the approximate angles 446, 448, and 450 may comprise about 9°, 18° and 27° respectively on the outboard section 436 (e.g., for three seats in a row), and angles 458 and 460 may comprise about 9° and 18° for the center section 434 respectively.

There is substantially not a single plane of symmetry through a middle of each of the trapezoidal seats 316. Thus, seats on a right hand side of an airplane may use an interchangeable seat cushion, and seats on a left hand side of the airplane may be a mirror dimensionally, but may not be interchangeable with the interchangeable seat cushion for the right hand side of the airplane. A configuration of seat angles can be used to create adequate clearance between seats without needing to increase a seat pitch. Seat cushion angles and relative angles between seats may be configured according to aircraft type.

Figure 4C:
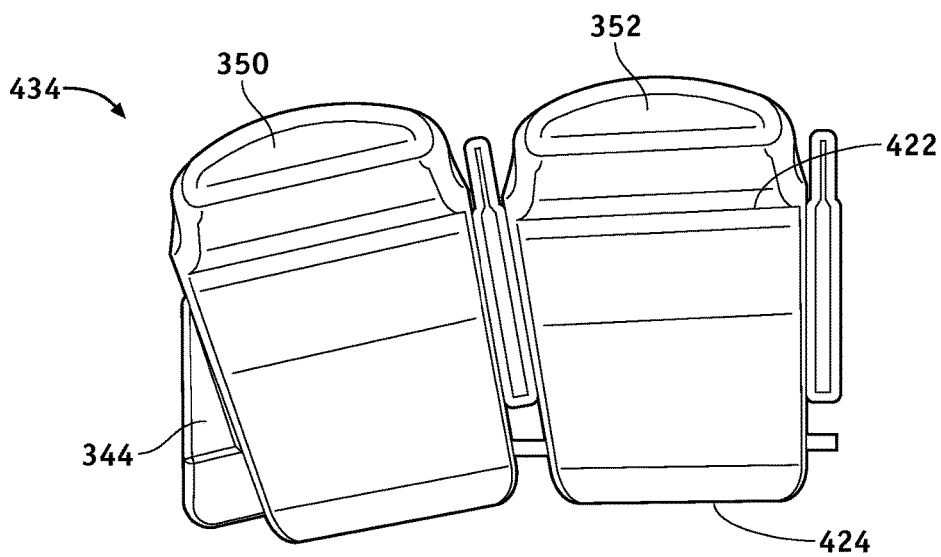
FIGS. 4C-4D are illustration of expanded top views of center section seats and an outboard section seats of an aircraft respectively according to embodiments of the disclosure.
Figure 4D:
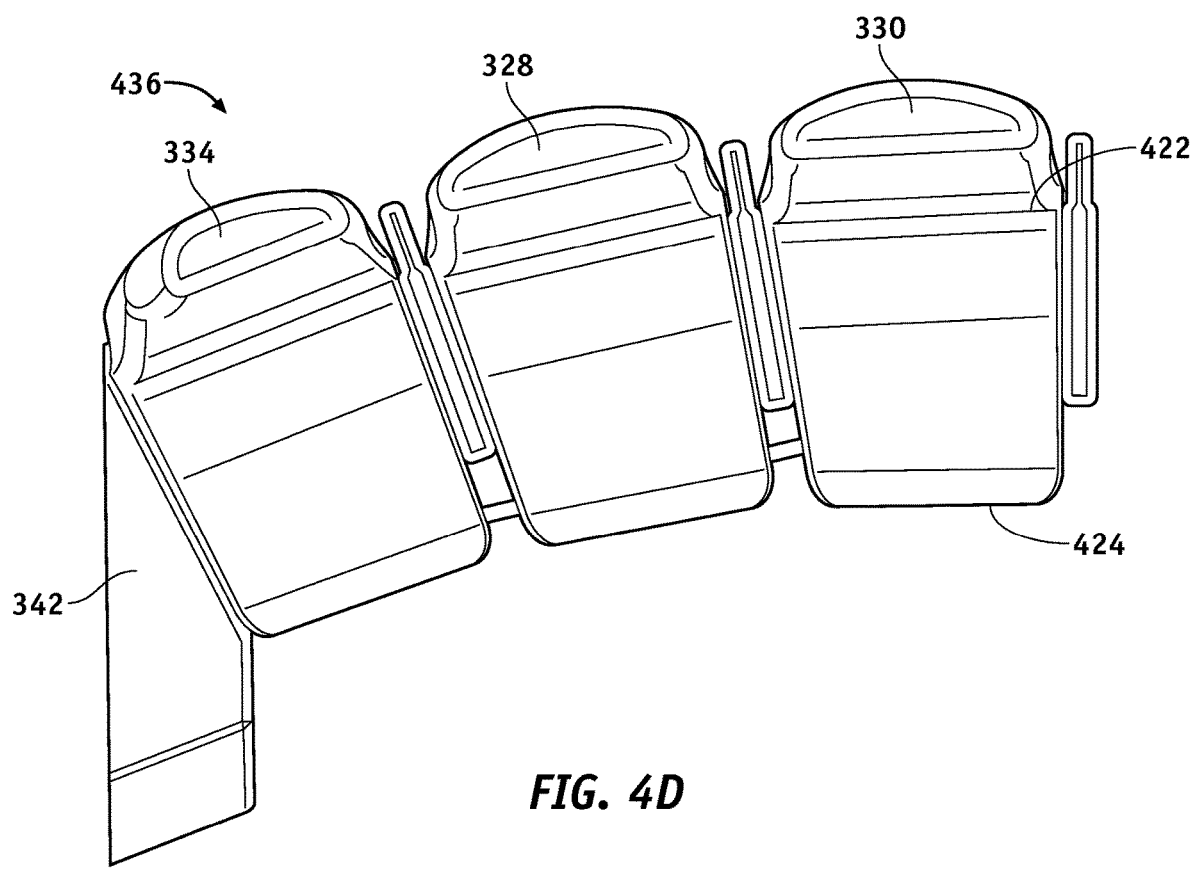

FIGS. 4C-4D are illustration of expanded top views of seats on the the center section 434 and the outboard section 436 respectively according to embodiments of the disclosure.

Figure 5:
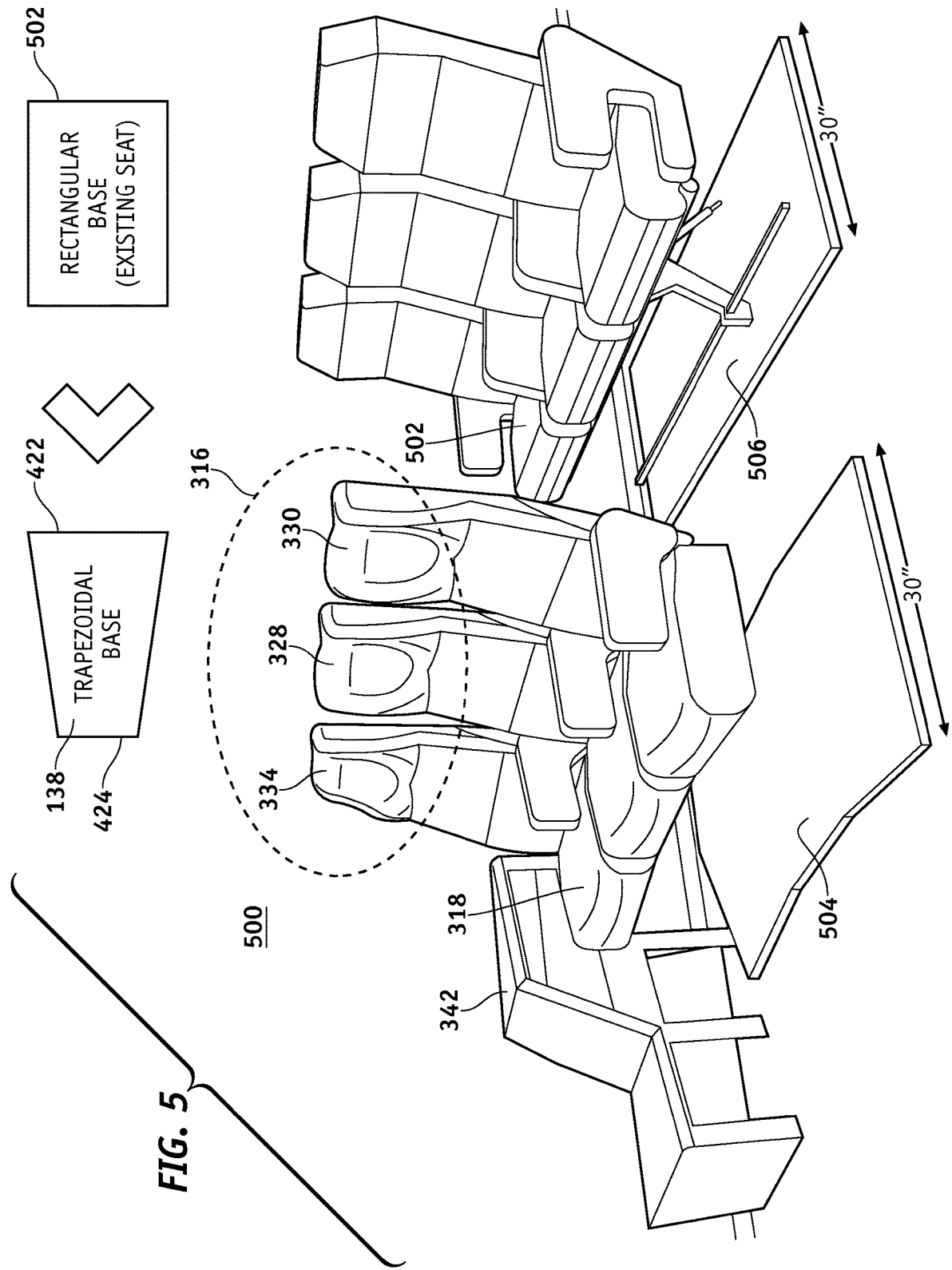
FIG. 5 is an illustration of a large-scale plan view of an exemplary row of three seats of a curved seating arrangement according to an embodiment of the disclosure compared to a row of three seats of an existing seating arrangement.

FIG. 5 is an illustration of a large-scale plan view 500 of an exemplary row of three seats comprising the trapezoidal base 318 of a curved seating arrangement according to an embodiment of the disclosure compared to a row of three seats comprising a rectangular base 502 of an existing seating arrangement. The curved seating arrangement using the trapezoidal base 318 occupies a trapezoidal area 504 which is less than a rectangular area 506 occupied by the existing seating arrangement that uses the rectangular base 502. The smaller space occupied by the trapezoidal area 504 allows the floor storage unit 342 to be placed alongside the sidewall seat 334. In some embodiments, the trapezoidal seats 316 may be supported only by the floor storage unit 342. As shown in FIG. 5, the trapezoidal seats 316 comprising the sidewall seats 334, the row center seat 328 and the aisle seat 330, are suspended in a cantilever manner.

Figure 6:
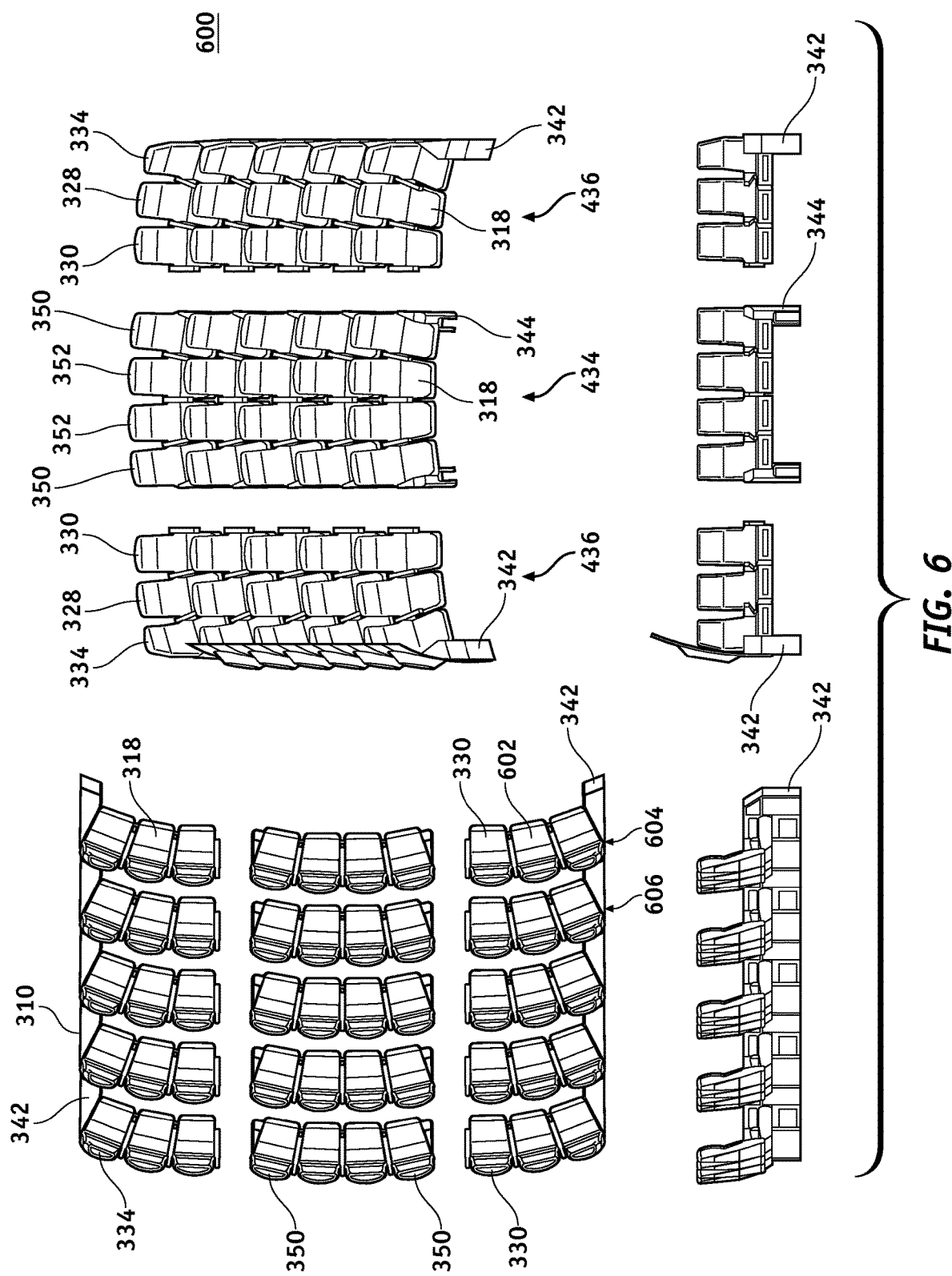
FIG. 6 is an illustration of various views of an exemplary curved seating arrangement according to an embodiment of the disclosure.

FIG. 6 is an illustration of various views 600 of an exemplary curved seating arrangement according to an embodiment of the disclosure. A first row seat 602 in a first row 604 can be adjusted back to fit between two seats in a second row 606 behind the first row 604. The first row seat 602 may comprise, for example, the outboard aisle seat 330 or a center seat such as the row center seats 328.

Figure 7:
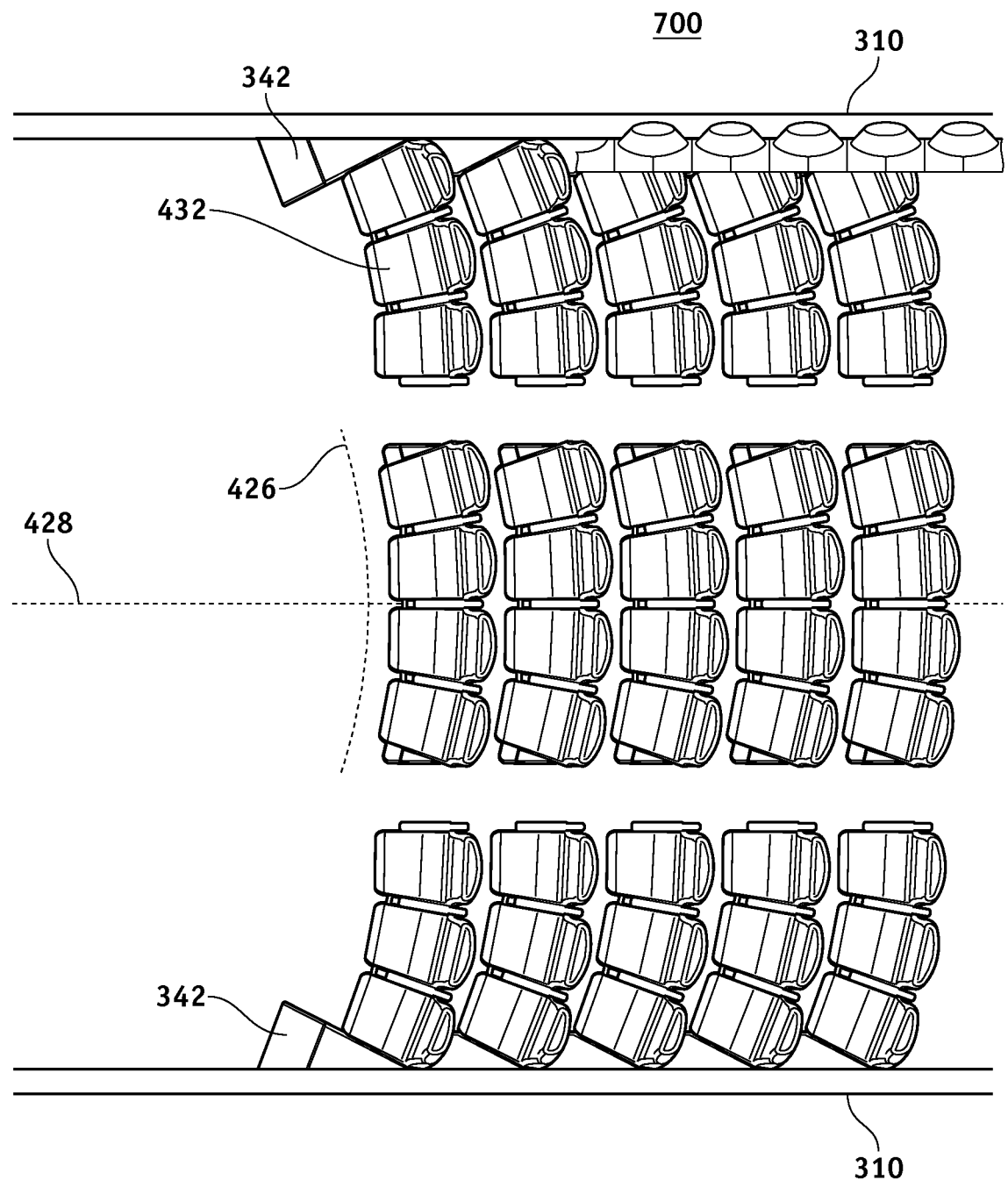
FIG. 7 is an illustration of a plan view of an exemplary curved seating arrangement according to an embodiment of the disclosure.

FIG. 7 is an illustration of a plan view 700 of an exemplary curved seating arrangement according to an embodiment of the disclosure.

Figure 8:
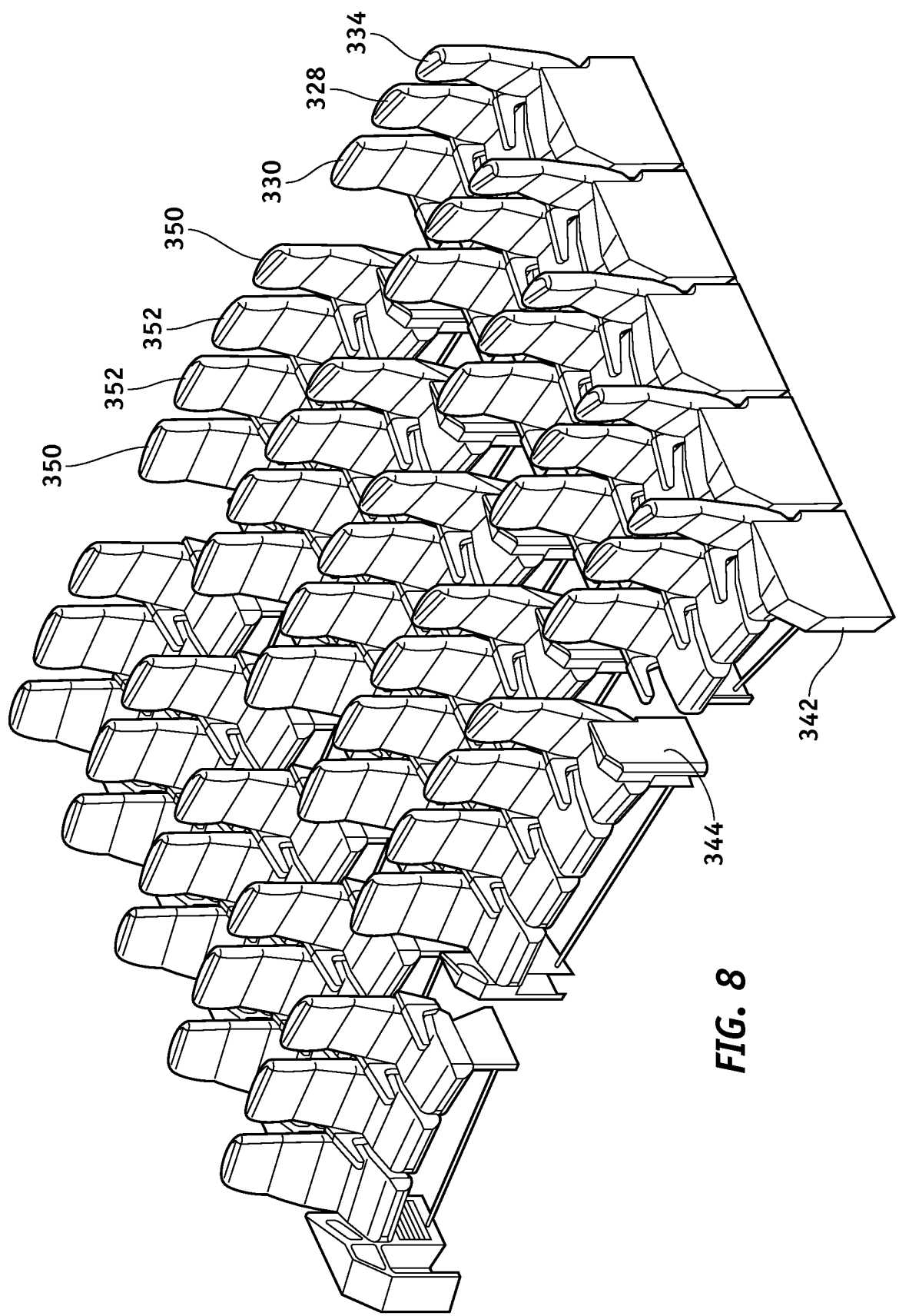
FIG. 8 is an illustration of a plan view of an exemplary curved seating arrangement according to an embodiment of the disclosure.

FIG. 8 is an illustration of a perspective view 800 of an exemplary curved seating arrangement according to an embodiment of the disclosure.

Figure 9:
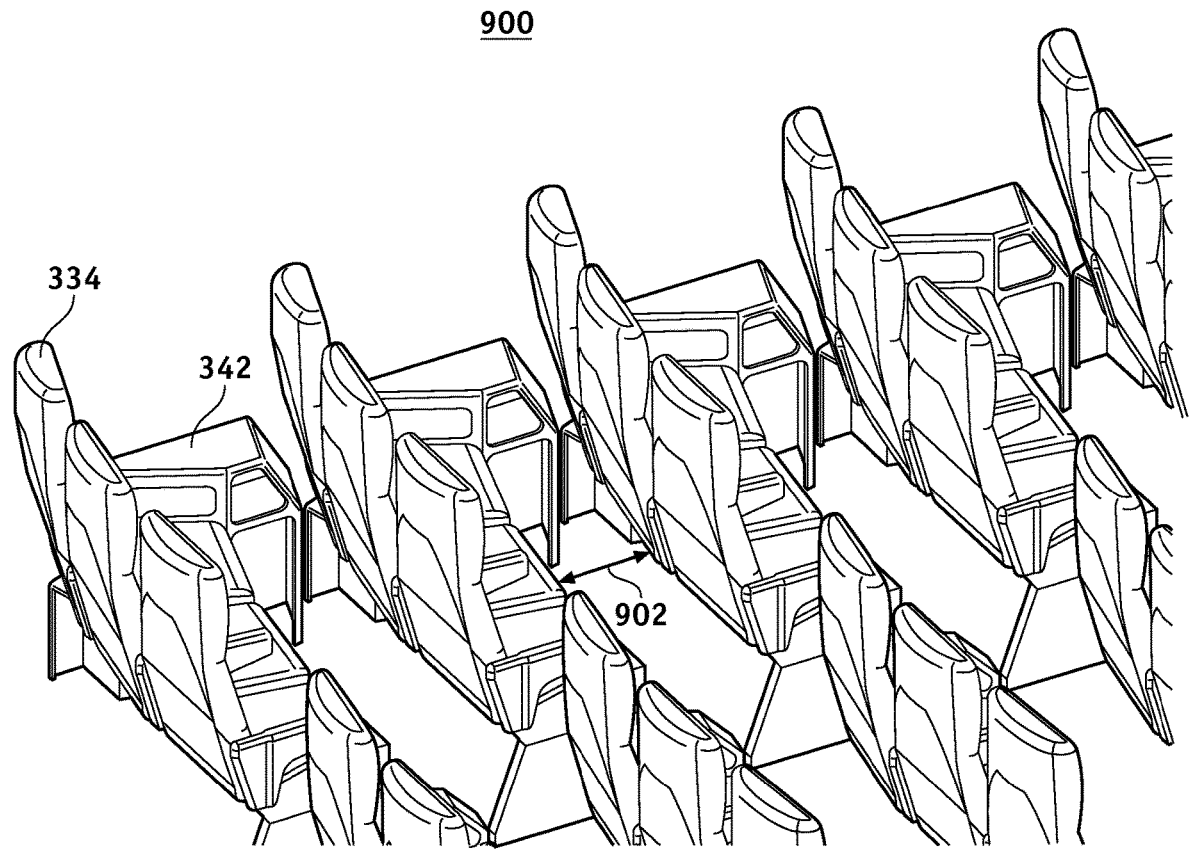
FIG. 9 is an illustration of a plan view of an exemplary curved seating arrangement according to an embodiment of the disclosure.

FIG. 9 is an illustration of a plan view 900 of an exemplary curved seating arrangement showing a row pitch 902 according to an embodiment of the disclosure.

Figure 10:
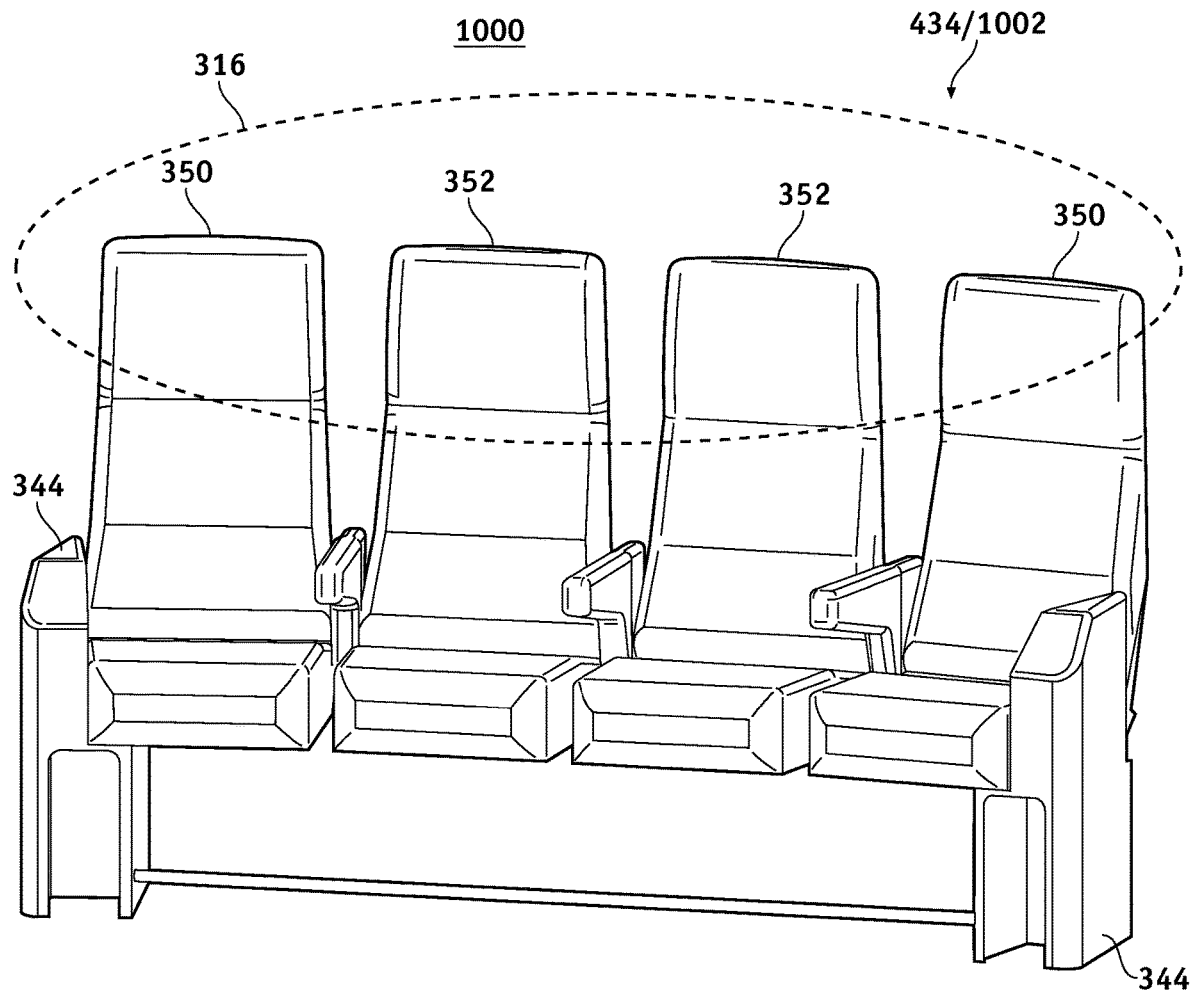
FIG. 10 is an illustration of an exemplary curved seating arrangement according to an embodiment of the disclosure.

FIG. 10 is an illustration of an exemplary curved seating arrangement 1000 showing a curved seating row 1002 according to an embodiment of the disclosure. The curved seating row 1002 may be located at the center section 434 comprising two of the center section straight seats 352 between the center section aisle seats 350. The curved seating row 1002 may further comprise two of the side support units 344 coupled to the center section aisle seats 350. In some embodiments, the curved seating row 1002 (e.g., trapezoidal seats 316 of the center section 434) may be supported only by the side support unit 344. As shown in FIG. 10, the curved seating row 1002 (trapezoidal seats 316) are suspended in a cantilever manner between the side support units 344.

FIG. 11 is an illustration of various views 1100 of an exemplary curved seating arrangement according to an embodiment of the disclosure. A first row seat in a first row can be adjusted back in an adjusted position 1102 to fit between two seats in the second row 606 behind the first row 604 as shown in FIG. 6 above. The straight seat may be the outboard aisle seat 330 or a center seat such as the row center seats 328.

In one embodiment, the trapezoidal seats 316 are supported only by a side unit such as the floor storage unit 342 or the side support unit 344. Also, trapezoidal seats 1104 comprise a first most-angled seat 1106 on a first side 1108 and a second most-angled seat 1110 on a second side 1112. A first side unit 1114 is coupled to the first most-angled seat 1106, and a second side unit 1116 is coupled to the second most-angled seat 1110. The trapezoidal seats 1104 are supported only by the first side unit 1114 and the second side unit 1116.

Figure 12:
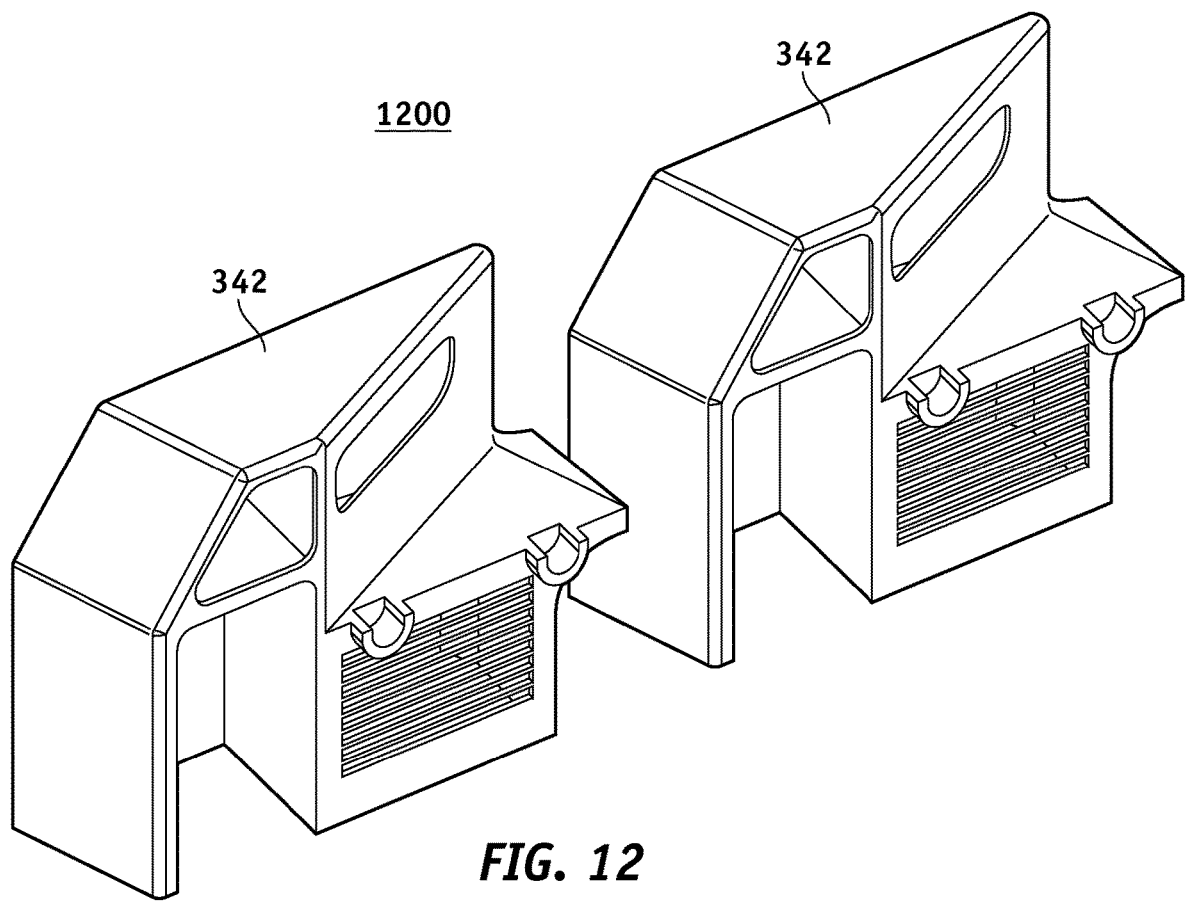
FIG. 12 is an illustration of an exemplary passenger floor storage bin according to an embodiment of the disclosure.

FIG. 12 is an illustration of an exemplary passenger floor storage bin 342 according to an embodiment of the disclosure.

Figure 13:
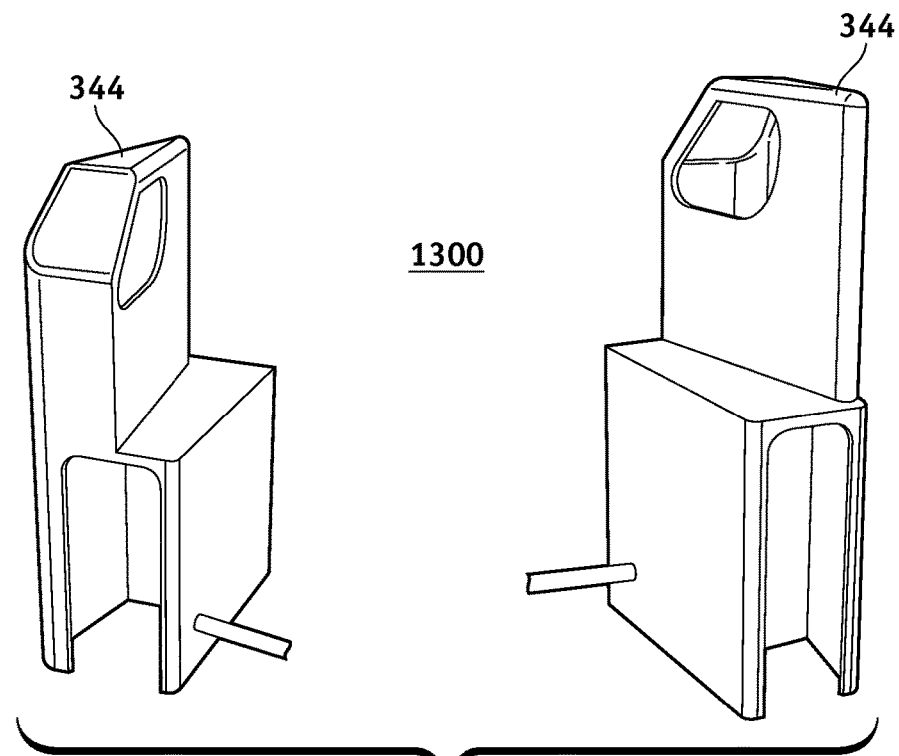
FIG. 13 is an illustration of an exemplary side support unit of a curved seating arrangement according to an embodiment of the disclosure.

FIG. 13 is an illustration of an exemplary side support unit 344 of a curved seating arrangement according to an embodiment of the disclosure.

Figure 14:
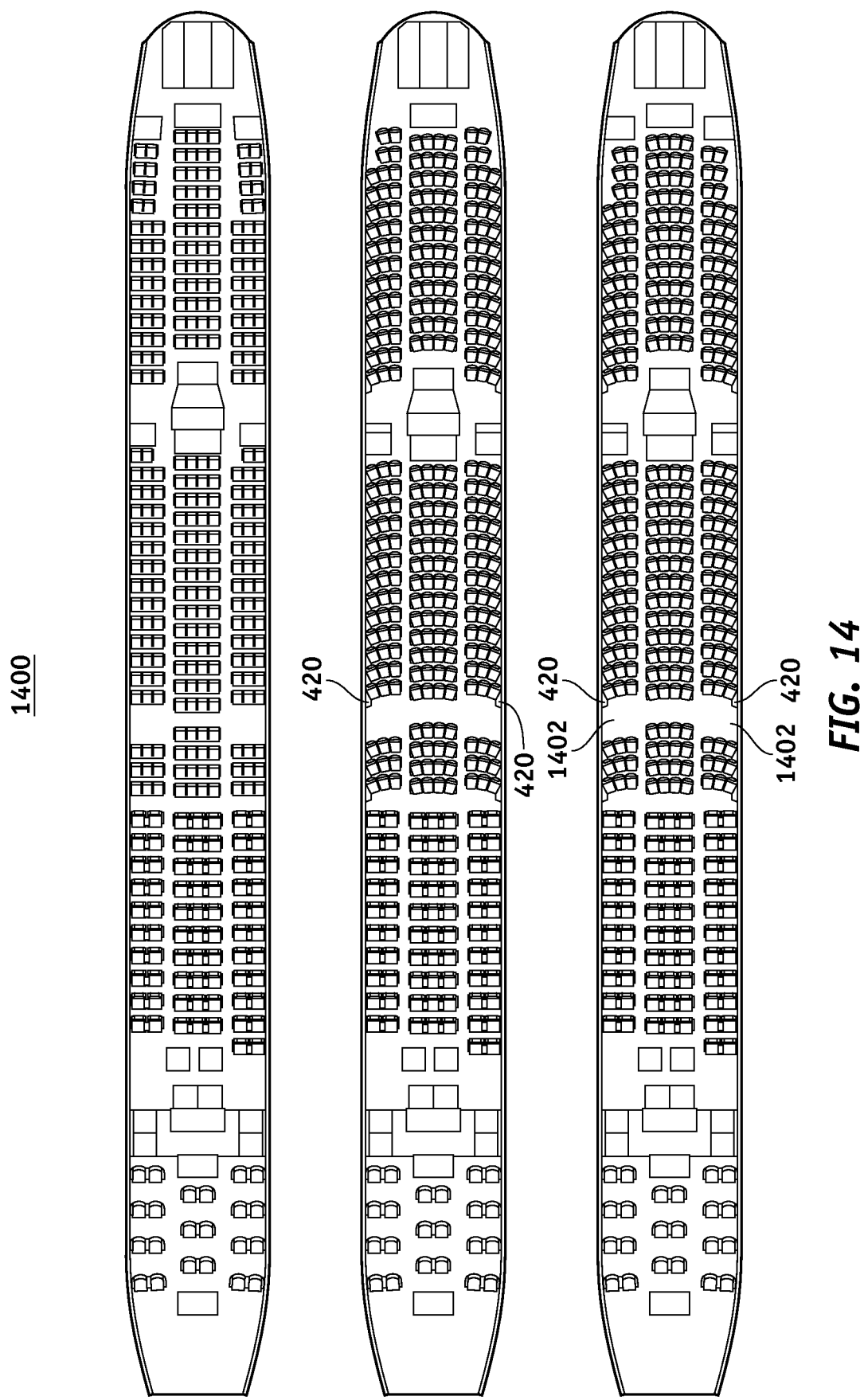
FIG. 14 is an illustration of an exemplary curved seating arrangement showing added space according to an embodiment of the disclosure.

FIG. 14 is an illustration of an exemplary curved seating arrangement showing an added space such as the open area 420 and an open exit space 1402 according to an embodiment of the disclosure.

Figure 15:
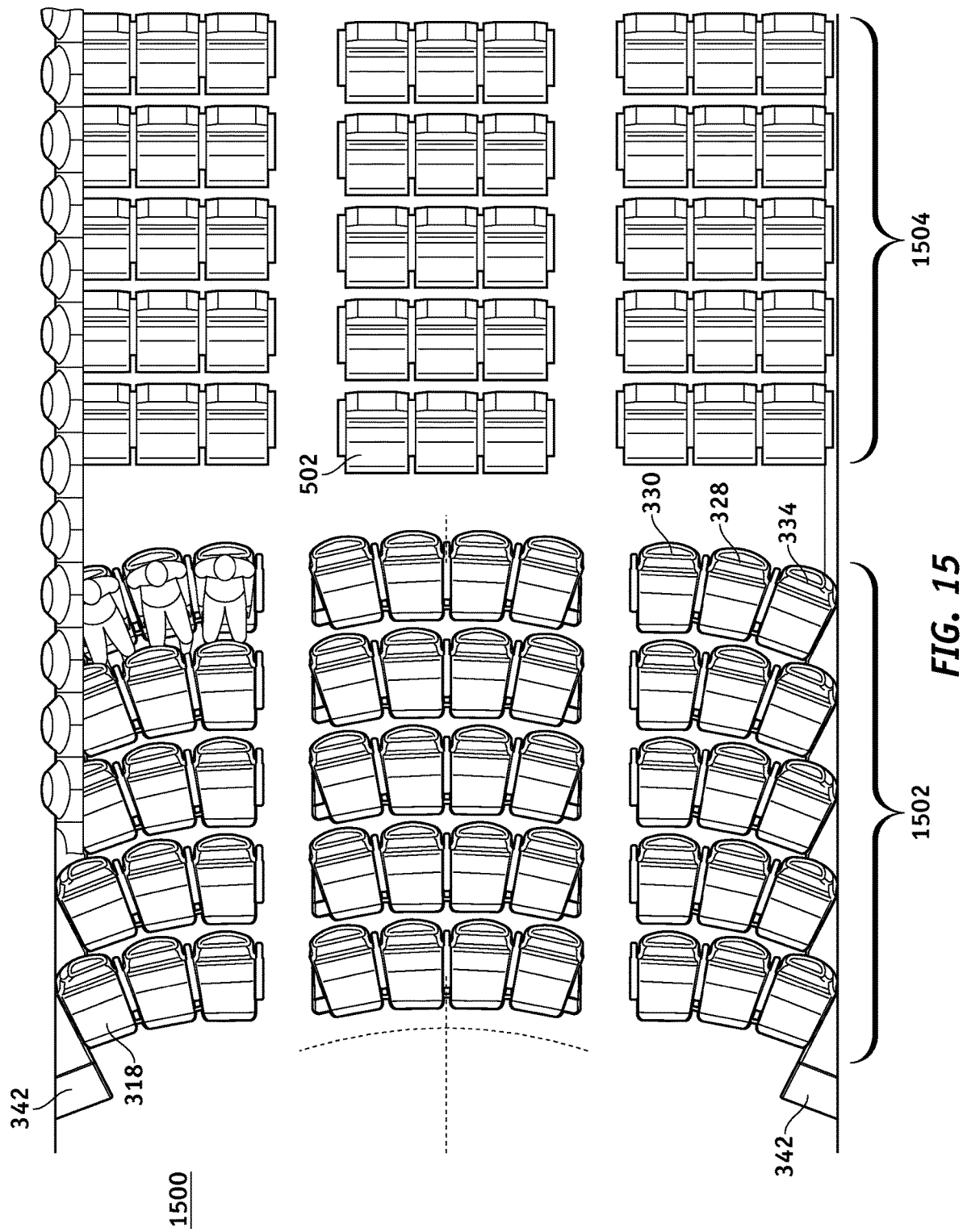
FIG. 15 is an illustration of a plan view of an interior of a passenger area of an aircraft showing an exemplary curved seating arrangement according to an embodiment of the disclosure compared to existing seating arrangement.

FIG. 15 is an illustration of a plan view of an interior of a passenger area of an aircraft showing an exemplary curved seating arrangement 1502 according to an embodiment of the disclosure compared to an existing seating arrangement 1504. Current seating layouts assume a floor area taken by a passenger is a rectangle such as the rectangular base 502 shown in FIG. 5. Embodiments of the disclosure provide a curved seating arrangement using trapezoidal wedges such as the trapezoidal base 318 allowing greater seat width without decreasing a quantity of seats which can be fit into an airplane cabin zone. Embodiments of the disclosure also provide the triangular shaped passenger floor storage bin 342 without decreasing seat width. The triangular shaped passenger floor storage bin 342 is enabled via using trapezoid shaped seat cushions on the trapezoidal seats 316 placed in a curved seating row such as the curved seating row 1002 shown in FIG. 10.

Figure 16:
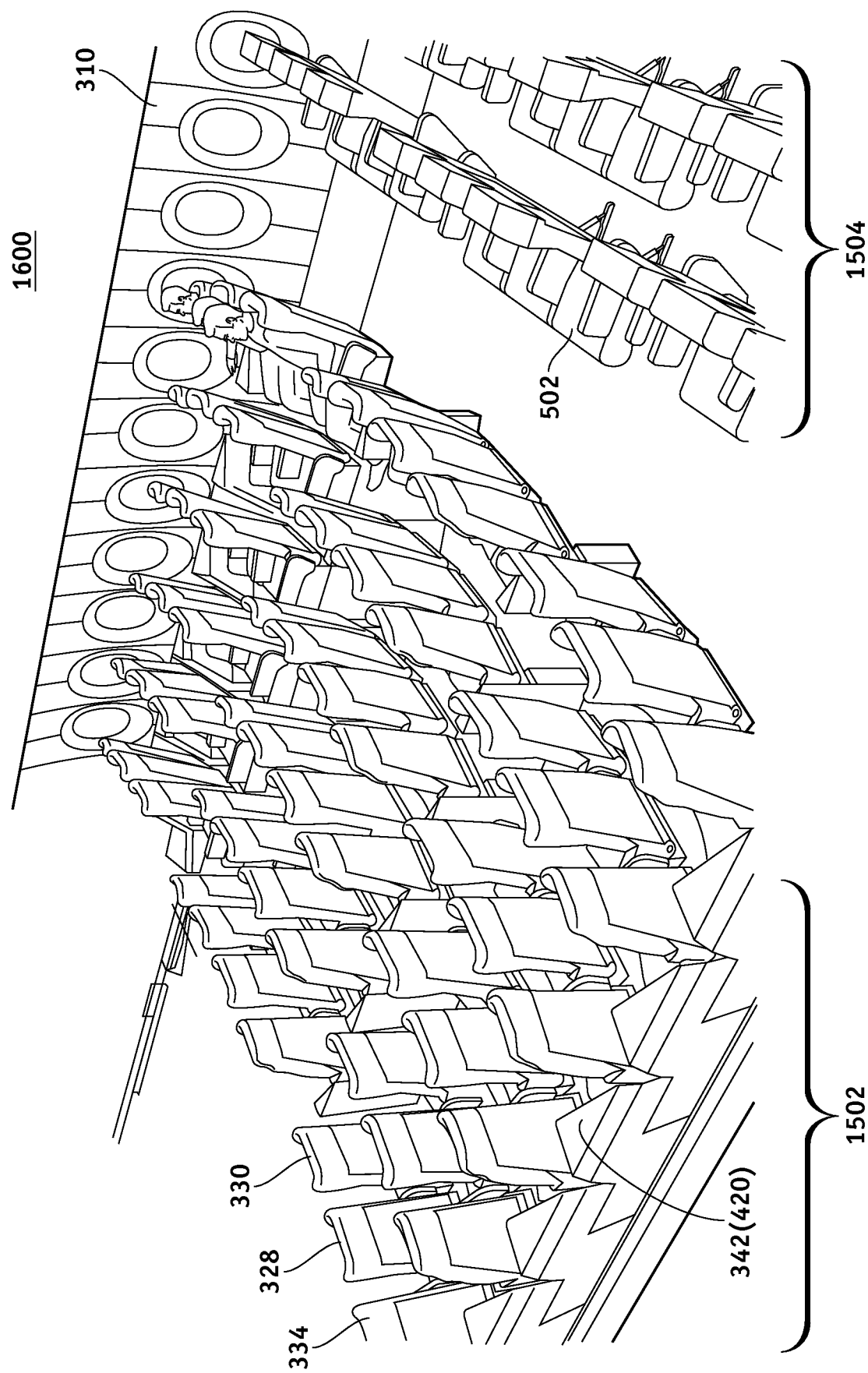
FIG. 16 is an illustration of a plan view of an interior of a passenger area of an aircraft showing an exemplary curved seating arrangement according to an embodiment of the disclosure compared to existing seating arrangement.

FIG. 16 is an illustration of a plan view of an interior of a passenger area of an aircraft showing an exemplary curved seating arrangement 1502 according to an embodiment of the disclosure compared to the existing seating arrangement 1504. Thus, in contrast to the curved seating arrangement 1502, no added space such as the open area 420 is available in the existing seating arrangement 1504.

Figure 17:
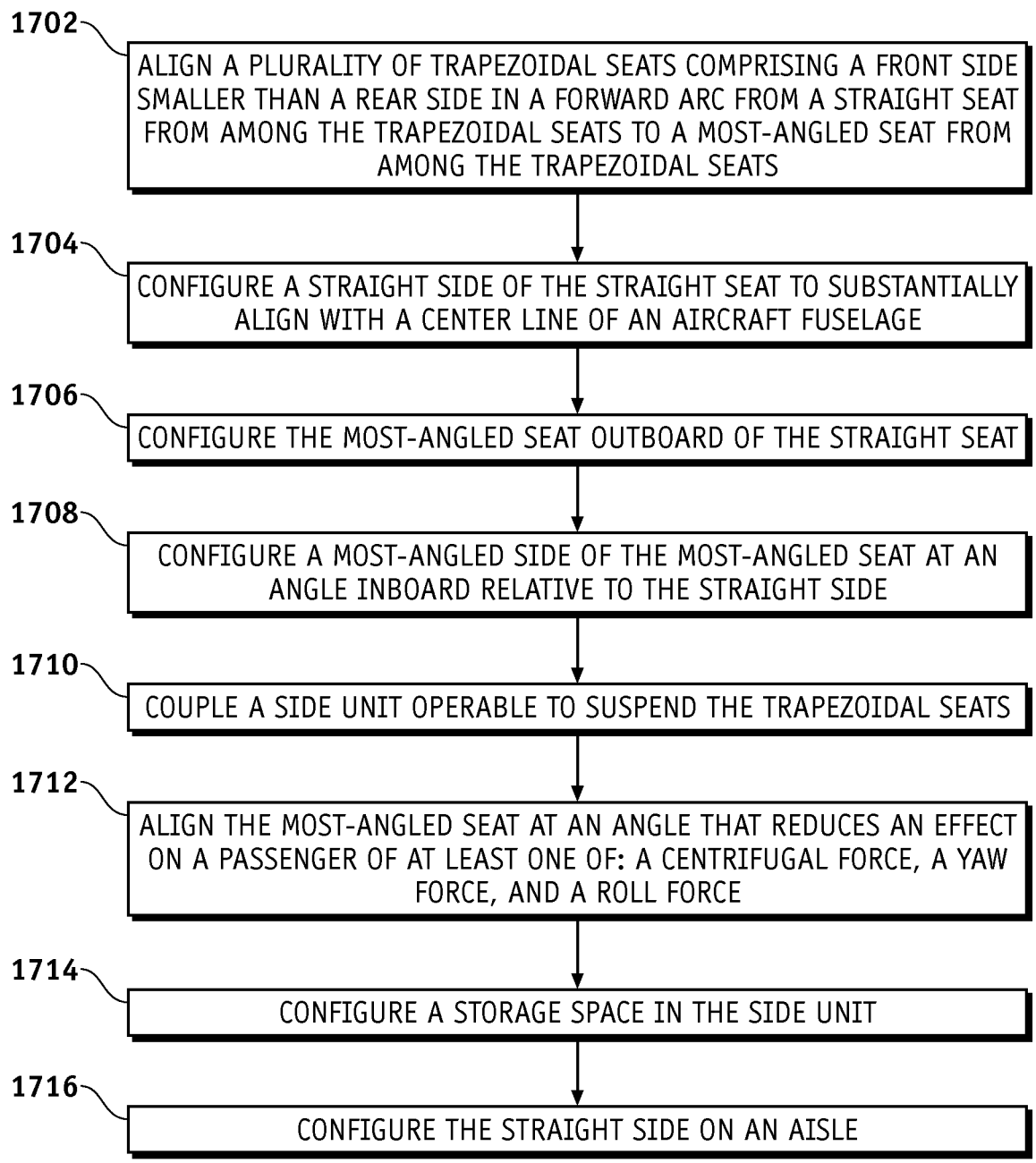
FIG. 17 is an illustration of an exemplary flowchart showing a process for configuring a curved sitting arrangement according to an embodiment of the disclosure.

FIG. 17 is an illustration of an exemplary flowchart showing a process 1700 for configuring a curved seating arrangement according to an embodiment of the disclosure. The various tasks performed in connection with process 1700 may be performed mechanically, by software, hardware, firmware, computer-readable software, computer readable storage medium, or any combination thereof. It should be appreciated that process 1700 may include any number of additional or alternative tasks, the tasks shown in FIG. 17 need not be performed in the illustrated order, and the process 1700 may be incorporated into a more comprehensive procedure or process having additional functionality not described in detail herein.

For illustrative purposes, the following description of process 1700 may refer to elements mentioned above in connection with FIGS. 1-14. In some embodiments, portions of the process 1700 may be performed by different elements of the arrangement shown, for example, in FIG. 3 such as: the trapezoidal seats 316, the triangular shaped passenger floor storage bin 342, the side support unit 344 etc. It should be appreciated that process 1700 may include any number of additional or alternative tasks, the tasks shown in FIG. 17 need not be performed in the illustrated order, and the process 1700 may be incorporated into a more comprehensive procedure or process having additional functionality not described in detail herein.

Process 1700 may begin by aligning a plurality of trapezoidal seats comprising a front side smaller than a rear side in a forward arc from a straight seat from among the trapezoidal seats to a most-angled seat from among the trapezoidal seats (task 1702).

Process 1700 may continue by configuring a straight side of the straight seat to substantially align with a center line of an aircraft fuselage (task 1704).

Process 1700 may continue by configuring the most-angled seat outboard of the straight seat (task 1706).

Process 1700 may continue by configuring a most-angled side of the most-angled seat at an angle inboard relative to the straight side (task 1708).

Process 1700 may continue by coupling a side unit operable to suspend the trapezoidal seats (task 1710).

Process 1700 may continue by aligning the most-angled seat at an angle that reduces an effect on a passenger of at least one of: a centrifugal force, a yaw force, and a roll force (task 1712).

Process 1700 may continue by configuring a storage space in the side unit (task 1714).

Process 1700 may continue by configuring the straight side on an aisle (task 1716).

Figure 18:
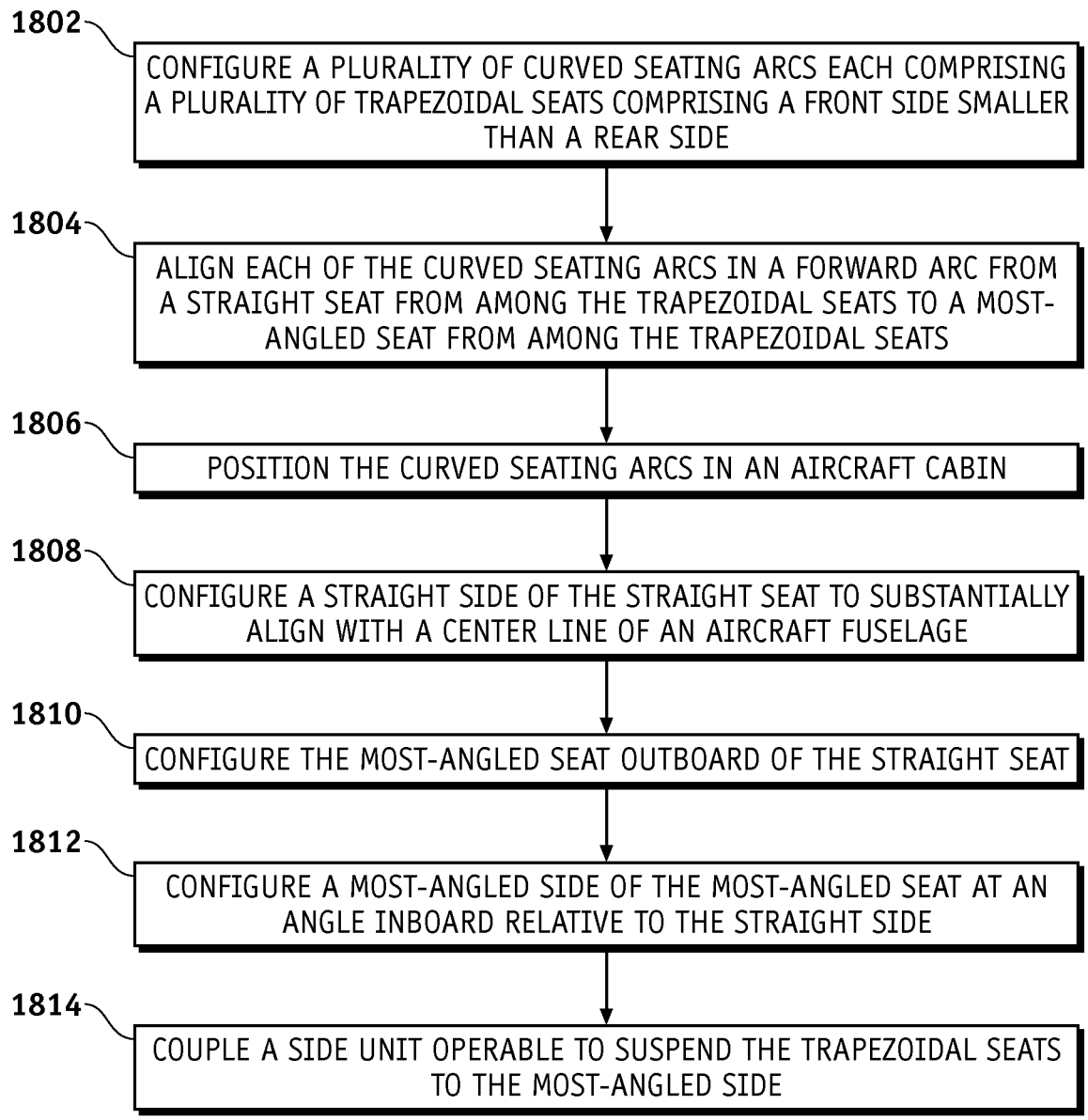
FIG. 18 is an illustration of an exemplary flowchart showing a process for configuring aircraft passenger cabin seating according to an embodiment of the disclosure

FIG. 18 is an illustration of an exemplary flowchart showing a process 1800 for configuring aircraft passenger cabin seating according to an embodiment of the disclosure. The various tasks performed in connection with process 1800 may be performed mechanically, by software, hardware, firmware, computer-readable software, computer readable storage medium, or any combination thereof. It should be appreciated that process 1800 may include any number of additional or alternative tasks, the tasks shown in FIG. 18 need not be performed in the illustrated order, and the process 1800 may be incorporated into a more comprehensive procedure or process having additional functionality not described in detail herein.

For illustrative purposes, the following description of process 1800 may refer to elements mentioned above in connection with FIGS. 1-14. In some embodiments, portions of the process 1800 may be performed by different elements of the arrangement shown, for example, in FIG. 3 such as: the trapezoidal seats 316, the triangular shaped passenger floor storage bin 342, the side support unit 344 etc. It should be appreciated that process 1800 may include any number of additional or alternative tasks, the tasks shown in FIG. 18 need not be performed in the illustrated order, and the process 1800 may be incorporated into a more comprehensive procedure or process having additional functionality not described in detail herein.

Process 1800 may begin by configuring a plurality of curved seating arcs each comprising a plurality of trapezoidal seats comprising a front side smaller than a rear side (task 1802).

Process 1800 may continue by aligning each of the curved seating arcs in a forward arc from a straight seat from among the trapezoidal seats to a most-angled seat from among the trapezoidal seats (task 1804).

Process 1800 may continue by positioning the curved seating arcs in an aircraft cabin (task 1806).

Process 1800 may continue by configuring a straight side of the straight seat to substantially align with a center line of an aircraft fuselage (task 1808). Substantially align means alignment may be made according to limits of practice and practical considerations, and measured with an accuracy allowed by measurements devices.

Process 1800 may continue by configuring the most-angled seat outboard of the straight seat (task 1810).

Process 1800 may continue by configuring a most-angled side of the most-angled seat at an angle inboard relative to the straight side (task 1812).

Process 1800 may continue by coupling a side unit operable to suspend the trapezoidal seats to the most-angled side (task 1814).

In this way, embodiments of the disclosure provide a curved seating arrangement using trapezoidal wedges allowing greater seat width without decreasing a quantity of seats which can be fit into an airplane cabin zone. Embodiments of the disclosure also provide triangular side stowage units without decreasing seat width. A triangular shaped passenger sidewall floor storage bin is enabled via using trapezoid shaped seat cushions on passenger seats placed in a curved seating row.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-15 depict example arrangements of elements, additional intervening elements, devices, features, or components may be present in an embodiment of the disclosure.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A forward concave trapezoidal seating system comprising:
    a plurality of trapezoidal seats comprising a trapezoidal base, the trapezoidal base comprising a front side smaller than a rear side,
    the trapezoidal seats aligned in a forward arc from a straight seat from among the trapezoidal seats to a most-angled seat from among the trapezoidal seats, wherein the trapezoidal base of the straight seat comprises a straight side of the straight seat in parallel with a center line of an aircraft fuselage; and
    a most-angled side of the most-angled seat angled inboard relative to the straight side of the trapezoidal base of the straight seat, the most-angled seat outboard of the straight seat,
    wherein the straight side of the trapezoidal base of the straight seat is configured on an aisle.

2. The system of claim 1, further comprising a side unit coupled to the most-angled side of the most-angled seat and suspending the trapezoidal seats in a cantilever manner.

3. The system of claim 2, wherein the side unit comprises a storage space.

4. The system of claim 2, wherein the trapezoidal seats are supported only by the side unit.

5. The system of claim 2, wherein:
    the trapezoidal seats comprise a first most-angled seat on a first side and a second most-angled seat on a second side,
    the side unit comprises a first side unit and a second side unit,
    the first side unit is coupled to the first most-angled seat,
    the second side unit is coupled to the second most-angled seat, and
    the trapezoidal seats are supported only by the first side unit and the second side unit.

6. The system of claim 2, wherein a side of the side unit is angled inboard relative to the straight side of the trapezoidal base of the straight seat, and
    wherein the side unit is outboard of the straight seat.

7. The system of claim 1, wherein a first row seat in a first row is adjustable to adjust back to recline between two seats in a second row behind the first row.

8. The system of claim 1, wherein the most-angled seat is aligned at an angle that reduces an effect on a passenger of at least one of: a centrifugal force, a yaw force, and a roll force.

9. A method for configuring a curved seating arrangement in an aircraft, the method comprising:
    aligning a plurality of trapezoidal seats comprising a trapezoidal base, the trapezoidal base comprising a front side smaller than a rear side in a forward arc from a straight seat from among the trapezoidal seats to a most-angled seat from among the trapezoidal seats, wherein the straight seat comprises a straight side of the trapezoidal base;
    configuring the straight side of the trapezoidal base of the straight seat in parallel with a center line of an aircraft fuselage;
    configuring the most-angled seat outboard of the straight seat;
    configuring a most-angled side of the most-angled seat at an angle inboard relative to the straight side; and
    configuring the straight side of the trapezoid base of the straight seat on an aisle.

10. The method of claim 9, further comprising suspending the trapezoidal seats in a cantilever manner from a side unit.

11. The method of claim 10, wherein suspending the trapezoidal seats in a cantilever manner comprises supporting the trapezoidal seats only by the side unit.

12. The method of claim 9, further comprising aligning the most-angled seat at an angle that reduces an effect on a passenger of at least one of: a centrifugal force, a yaw force, and a roll force.

13. The method of claim 9, wherein a side of a side unit is angled inboard relative to the straight side of the trapezoidal base of the straight seat and wherein the side unit is outboard of the straight seat.

14. The method of claim 9, wherein a first row seat in a first row is adjustable to adjust back to recline between two seats in a second row behind the first row.

15. A method for configuring aircraft passenger cabin seating, the method comprising:
    configuring a plurality of curved seating arcs each comprising a plurality of trapezoidal seats, the trapezoidal seats comprising a trapezoidal base, the trapezoidal base comprising a front side smaller than a rear side;
    aligning each of the curved seating arcs in a forward arc from a straight seat from among the trapezoidal seats to a most-angled seat from among the trapezoidal seats, wherein the trapezoidal base of the straight seat comprises a straight side in parallel with a center line of an aircraft fuselage;
    positioning the curved seating arcs in an aircraft cabin, wherein the trapezoidal seats are aligned and positioned in the aircraft cabin such that none of the trapezoidal seats are angled outboard; and
    suspending the trapezoidal seats in a cantilever manner from a side unit.

16. The method of claim 15, wherein suspending the trapezoidal seats in a cantilever manner comprises supporting the trapezoidal seats only by the side unit.

17. The method of claim 15, wherein a side of the side unit is angled inboard relative to the straight side of the trapezoidal base of the straight seat and wherein the side unit is outboard of the straight seat.

18. The method of claim 15, further comprising:
    configuring the most-angled seat outboard of the straight seat; and
    configuring a most-angled side of the most-angled seat at an angle inboard relative to the straight side.

19. The method of claim 15, further comprising configuring the straight side of the trapezoidal base of the straight seat on an aisle.

20. The method of claim 15, wherein configuring the plurality of curved seating arcs comprises forming at least one aisle separating adjacent ones of the plurality of curved seating arcs.

* * * * *